United States Patent [19]

Thomas

[11] 4,393,376
[45] Jul. 12, 1983

[54] TELETEXT INTERFACE FOR DIGITAL STORAGE MEDIUM HAVING SYNTHETIC VIDEO GENERATOR

[75] Inventor: William L. Thomas, Northbrook, Ill.

[73] Assignee: Zenith Radio Corporation, Glenview, Ill.

[21] Appl. No.: 270,293

[22] Filed: Jun. 4, 1981

[51] Int. Cl.³ .............................................. G09G 1/16
[52] U.S. Cl. ................................... 340/717; 340/728; 340/745; 340/700; 178/30; 358/1
[58] Field of Search ............... 340/717, 728, 700, 723, 340/745, 744, 789, 790; 358/1; 178/30, 15

[56] References Cited

U.S. PATENT DOCUMENTS

| | | | |
|---|---|---|---|
| 3,222,452 | 12/1965 | Banning, Jr. | 358/1 |
| 3,553,676 | 1/1971 | Raciti | 340/744 |
| 3,624,632 | 11/1971 | Ophir | 340/745 |
| 3,891,792 | 6/1975 | Kimura | 340/745 |
| 3,961,324 | 6/1976 | Cousin et al. | 340/717 |

Primary Examiner—Marshall M. Curtis
Attorney, Agent, or Firm—Jack Kail

[57] ABSTRACT

A teletext interface is coupled between a television receiver and a medium storing a plurality of digitally encoded signals each representing a selected text/graphics character intended for transmission as a corresponding synthetic video signal during the active scanning intervals of a television signal. The teletext interface includes a ROM for converting each of the digitally encoded signals to a teletext encoded signal representing a corresponding text/graphics character and apparatus for inserting the teletext encoded signals as a plurality of teletext formated data rows in successive teletext lines of the television signal. A television receiver including a built-in teletext decoder is responsive to the teletext formated data rows for displaying the selected text/graphics characters in a high quality form while a standard receiver is responsive to the synthetic video signal for displaying the characters in a poorer quality form.

12 Claims, 5 Drawing Figures

TELETEXT INTERFACE FOR DIGITAL STORAGE MEDIUM HAVING SYNTHETIC VIDEO GENERATOR

BACKGROUND OF THE INVENTION

The present invention relates generally to high quality video display systems and, more particularly, to a technique for improving the quality of the video presentation produced on the viewing screen of a television receiver in response to a source of text and/or graphics information such as a home computer or the like.

Standard television receivers are often used to display text and/or graphics information derived from various sources in addition to broadcast television programming signals. Such sources of text and/or graphics information typically include home computers, TV games, viewdata decoders, character generators, etc. Devices of this type normally include a memory which stores digitally encoded data representing a selected text and/or graphics video image intended for display on the viewing screen of the receiver. The contents of the memory are controlled by a control circuit such that the stored digitally encoded data may be updated from time to time to reflect desired changes in the video presentation. The stored digitally encoded data is converted by a display generator to corresponding video signals which are then modulated on an RF carrier and coupled to the antenna input terminals of the television receiver which converts the video signals to a corresponding display image. The quality of the resulting display image is therefore limited by the characteristics of the video processing circuits of the television receiver, which limitations include bandwidth restrictions and the like.

The present invention seeks to improve the quality of the display images produced in the foregoing manner through the use of a teletext type decoder which is built into the television receiver. More specifically, teletext is a generic term describing a television communications system using the vertical interval of a broadcast television son signal to transmit digitally encoded text and/or graphics information. A television receiver designed for displaying such teletext transmissions includes a teletext decoder responsive to the output of the video detector of the receiver for converting the received teletext encoded information into corresponding R, G, B video baseband signals which are used to directly drive the CRT of the receiver. Since the R, G, B video baseband signals developed by the teletext decoder directly drive the CRT, the resulting display image is not compromised or limited by the restricted bandwidth video processing circuits of the receiver with the result that an extremely high quality video display is produced on the viewing screen of the receiver. The ability of television receivers having built-in teletext capability to product high quality video displays is advantageously utilized in accordance with the present invention by converting the digitally encoded data stored in the memory of an external source of text and/or graphics information to a corresponding teletext endoded signal which may be processed by the television receiver. As a consequence, the stored data results in the generation of corresponding baseband video signals at the output of the teletext decoder for directly driving the CRT of the television receiver to produce a high quality video image, such being contrasted with the prior art technique of coupling RF modulated video signals representing the stored data to the antenna input terminals of the receiver for processing by the bandlimited video processing circuits thereof.

In another aspect of the invention, compatibility is maintained with standard television receivers (i.e. receivers not including built-in teletext decoders) by transmitting standard video signals during the active portions of the television signal corresponding to the teletext encoded data transmitted during the vertical intervals thereof. Thus, a standard television receiver may respond to the standard video signals for displaying the text and/or graphics information, although in a relatively low quality form, while a teletext equipped receiver may respond to the teletext encoded signals for producing the same display but at a higher quality level.

BRIEF DESCRIPTION OF THE DRAWINGS

The features of this invention which are believed to be novel are set forth with particularity in the appended claims. The invention, together with its objects and advantages thereof, may be best understood by reference to the following description taken in conjunction with the accompanying drawings, in which like reference numerals identify like elements in the several figures and in which:

DESCRIPTION OF THE PREFERRED EMBODIMENT

For purposes of an exemplary showing, the present invention will hereinafter be described in terms of an improved video display system using teletext communications techniques according to the British teletext transmission standards as set forth in British Broadcast Teletext Specification, September, 1976. It will be appreciated, however, that these particular standards are in no way intended to limit the scope of the invention which, in general, may be practiced in association with any teletext type communications system wherein digitally encoded data is cyclically transmitted on one or more unused lines of the vertical blanking interval of a broadcast television signal. Thus, numerous changes to the British teletext format; for example, the number of data rows comprising a page, the number of characters occupying a row, the encoding technique employed, etc. may be made without affecting the scope or utility of the invention.

Figure 1:
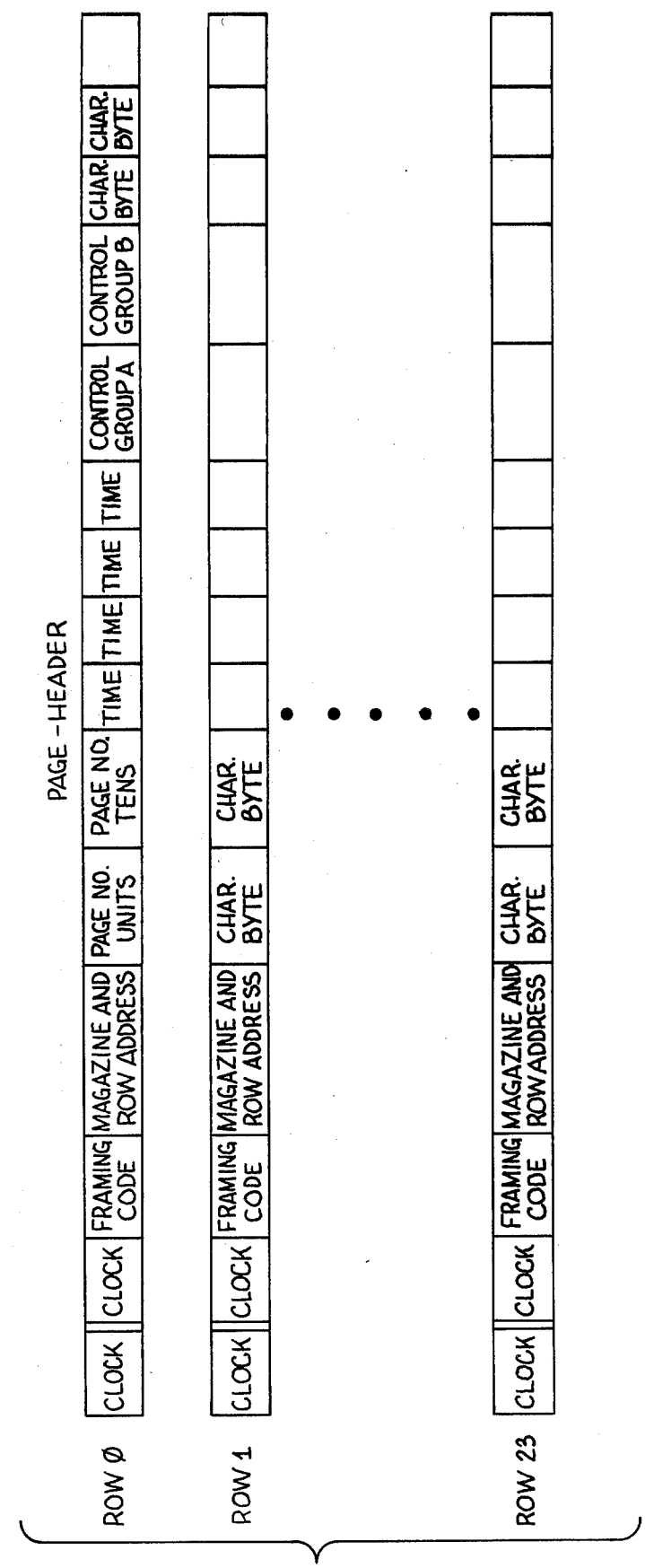
FIG. 1 diagrammatically illustrates the standard British teletext transmission format.

FIG. 1 illustrates the data format of a teletext transmission according to the foregoing British standards. Each teletext line of the vertical interval, horizontal scanning lines 17, 19, 330 and 331 in the 625 line British system, is encoded with 360 serially transmitted bits arranged in 45 eight bit Bytes and commonly referred to as a data row. Twenty four data rows comprise a page which represents the amount of information normally displayed on the viewing screen of a television receiver equipped with a teletext decoder, the pages being arranged into groups of 100 with each such group being referred to as a magazine. Row 0 of each page is referred to as a page-header and includes three initial Bytes, two clock run-in Bytes and a framing code Byte, which serve to synchronize the bit and Byte recovery operation in the receiver. The next two Bytes of the page-header row are encoded for identifying the magazine and row address while the page number code is contained within the next two Bytes. The next four Bytes are reserved for time codes followed by two control group codes. The final 32 Bytes of the page-header row are character Bytes each of which comprises an ASCII-like code representing a selected text or graphics character. The format of each of the remaining 23 rows is identical with the first three Bytes containing synchronization information, the next two Bytes magazine and row address information and the final 40 Bytes character information. As mentioned previously, each row of teletext data is transmitted on a single horizontal line during the vertical blanking interval of a television signal.

As will be explained in further detail below, a viewer may acquire and display any selected page of the teletext transmission, which page will be presented on the viewer's television screen in the form of 24 rows of characters, the first row containing 32 characters representing the 32 character Bytes of the transmitted page-header row and each of the remaining 23 rows containing 40 characters representing the 40 character Bytes transmitted during the corresponding data line.

Figure 2:
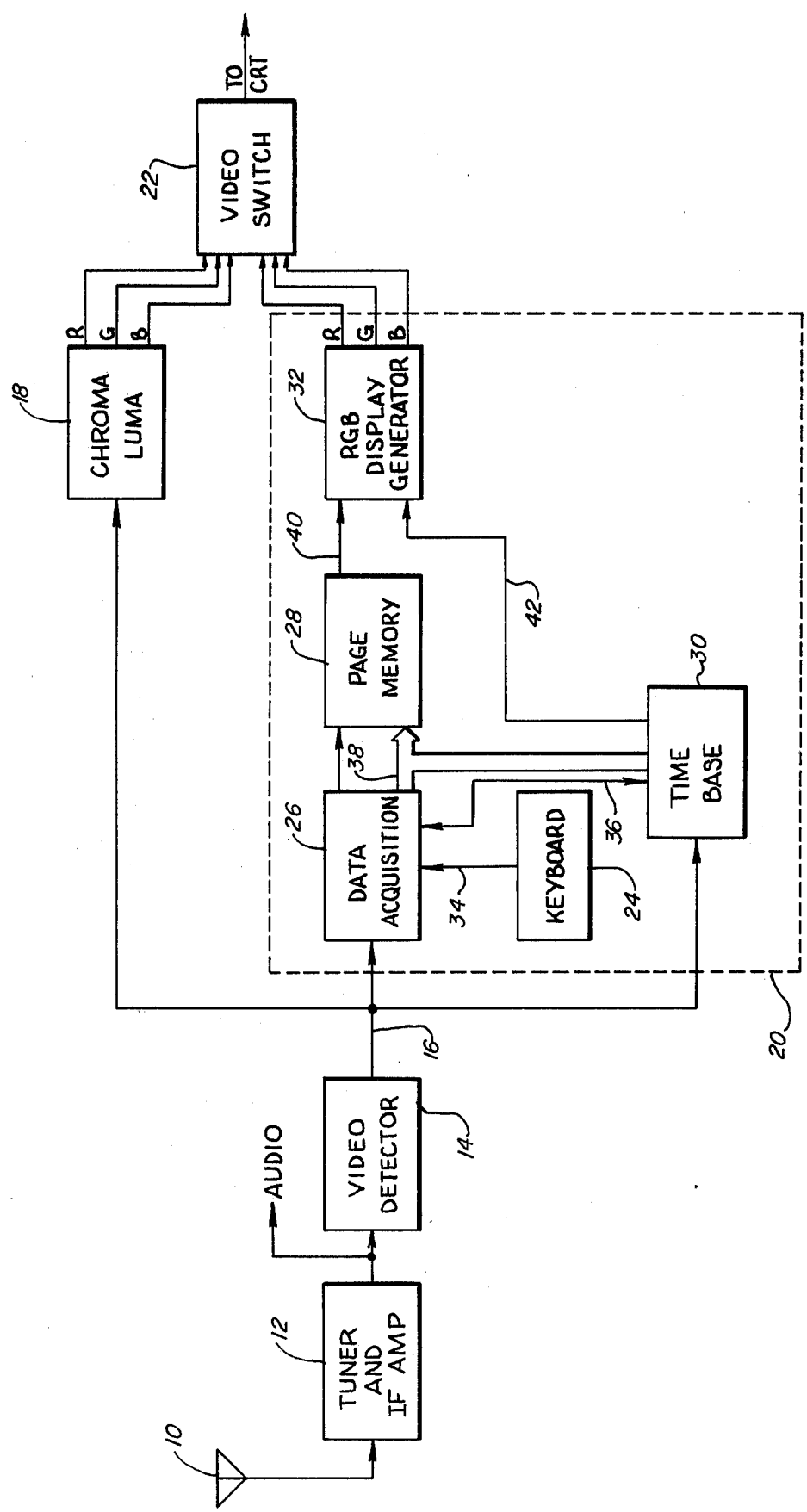
FIG. 2 is a block diagram showing a standard teletext decoder built into a television receiver.

A television receiver including a conventional teletext decoder adapted for acquiring and displaying a selected page of the transmitted teletext data base is illustrated in FIG. 2. For example, see Mullard Technical Information Note 54 (Mullard Ltd. Mullard House, Torrington Place, London WC1E7HD) in which this teletext circuitry is described in great detail. The television receiver includes an antenna 10 for intercepting the coupling the broadcast teletext encoded television signal to a tuner and IF amplifier stage 12, stage 12 converting the received signal to an intermediate frequency (IF) signal which is coupled to the audio section of the receiver (not shown) and also to a video detector stage 14. Video detector stage 14 develops a corresponding composite baseband video signal on a conductor 16, which baseband signal is coupled to a conventional chroma-luma stage 18 and also to the input of a teletext decoder 20. Chroma-luma stage 18, which includes a number of band-limited video processing circuits, operates in a conventional manner for developing R, G, B output signals representing the televised video image, the R, G, B output signals being coupled to a video switch 22 whose output supplies the CRT of the television receiver. When video switch 22 is operated for coupling the R, G, B output signals developed by chroma-luma stage 18 to the CRT, the television receiver is operated in its conventional mode wherein a color video image is displayed on the viewing screen corresponding to the normally broadcast television signal. The transmitted teletext data will not contribute to the display in this mode since it is encoded in the vertical blanking interval of the television signal. As will be explained in further detail below, when video switch 22 is operated for coupling the R, G, B signals representing a page of teletext information from teletext decoder 20 to the CRT, the 24 rows of teletext characters will be displayed on the viewing screen. Quite significantly, the R, G, B signals representing the teletext information are internally synthesized in decoder 20 in response to the encoded teletext transmission so that these signals are in no way subject to the bandlimited video processing circuits of the receiver and are thereby effective for producing an extremely high quality video image.

Teletext decoder 20 typically comprises a keyboard 24, a data acquisition circuit 26, a page memory 28, a time base circuit 30 and an RGB display generator 32. In order to acquire a selected page of teletext data for display, keyboard 24 is operated by the viewer for coupling the corresponding page and magazine number codes to data acquisition circuit 26 over a line 34. Data acquisition circuit 26, in response to timing signals received from time base circuit 30 via a conductor 36, acquires the selected teletext page and couples the encoded character Bytes forming the 24 rows of the selected page for storage in page memory 28. The page of encoded character Bytes stored in page memory 28 are subsequently read from memory one row at a time in response to address signals developed on a bus 38 and applied to RGB display generator 32 over a line 40. Display generator 32, in response to timing signals supplied on a line 42 from time base circuit 30, converts the character Bytes to corresponding R, G, B baseband video signals suitable for driving the CRT for displaying the 24 rows of text and/or graphics information represented by the encoded character Bytes stored in page memory 28.

Figure 3:
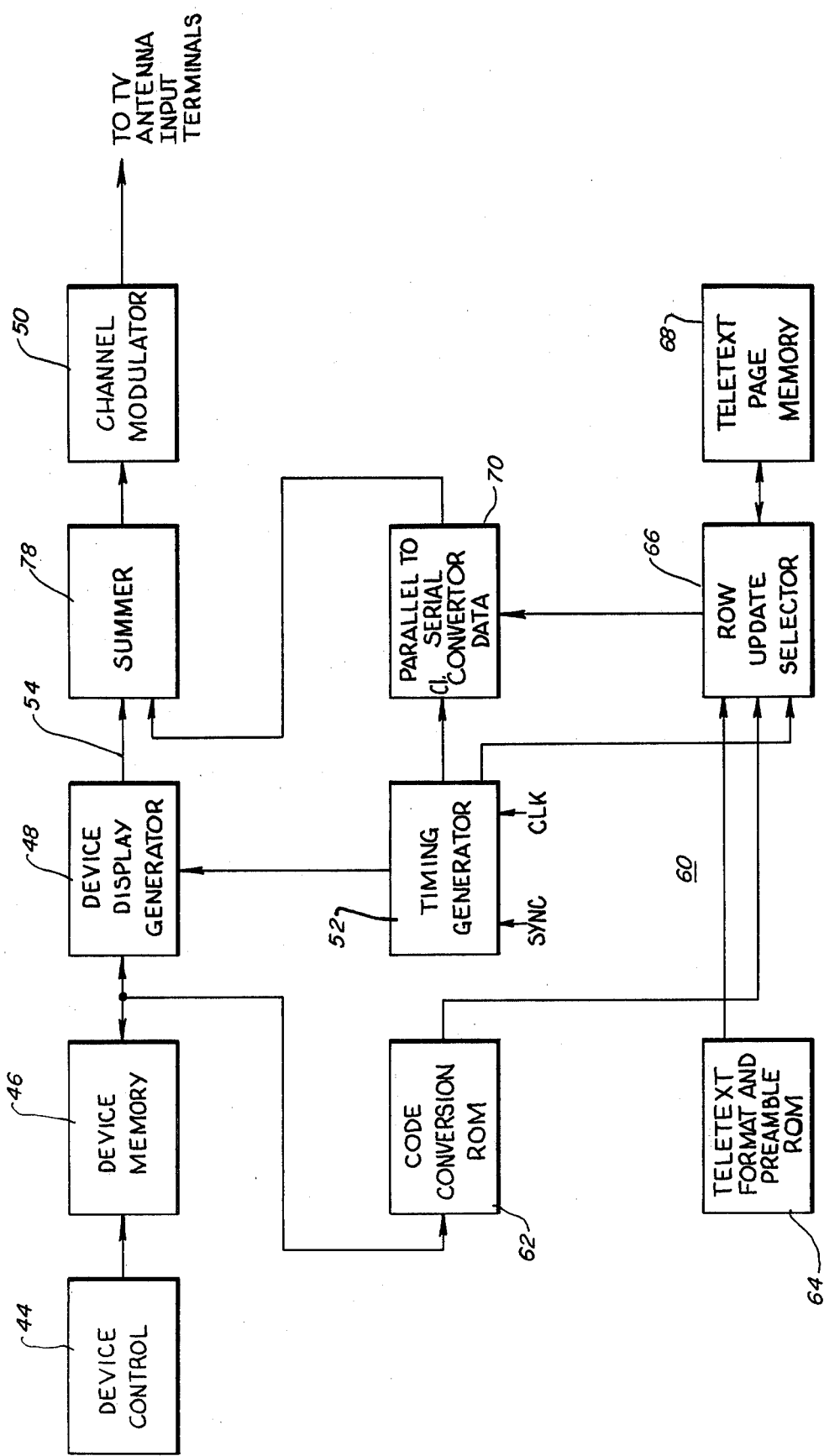
FIG. 3 is a block diagram showing the apparatus of the invention connected in association with a source of digitally encoded text and/or graphics information, which source includes apparatus for converting the digitally encoded information to corresponding video signals for application to the antenna terminals of a television receiver.

According to the present invention, the basic teletext system described above is advantageously employed to improve the quality of the display image produced on the viewing screen of a television receiver in response to a source of text and/or graphics information, which information source is normally viewer operable and may include, for example, a home computer, a TV game, a viewdata decoder, a character generator, or the like. Referring to FIG. 3, an information source of this type generally comprises a control circuit 44, a memory 46, a display generator 48 and a channel modulator 50. Memory 46 is normally a RAM device programmed for storing selected text and/or graphics information in digitally encoded form representing a video image intended for display on the viewing screen of a television receiver. The contents of memory 46 are controlled by control circuit 44, which may include a viewer operable keyboard or other viewer operable interface, such that the stored digitally encoded data may be updated from time to time to reflect desired changes in the video presentation. Display generator 48 is operated in response to suitable timing signals developed by a timing generator 52, supplied with input television sync signals as well as an input clock signal, for addressing device memory 46 and converting the digitally encoded data stored in the memory to a corresponding NTSC baseband video signal on an output conductor 54 of the display generator. That is, each row of data stored in memory 46 consists of a plurality of encoded text and/or graphics character Bytes which are converted by display generator 48 into corresponding video signals which take the form of a standard NTSC baseband television signal including the necessary horizontal and vertical synchronization components. Normally, the baseband video signals are amplitude modulated on a standard television channel RF carrier by channel modulator 50 and directly coupled to the antenna input terminals of a television receiver. Referring back to FIG. 2, the RF television signal representing the data stored in memory 46 is processed by stages 12, 14 and 18 of the television receiver for producing corresponding R, G, B baseband video signals which are coupled to the CRT for forming a display image reflecting the encoded data stored in memory 46. As explained previously, the quality of the resulting image displayed on the viewing screen of the receiver is relatively poor since the video signals representing the data stored in memory 46 are subjected to the bandwidth restrictions of the television receiver prior to being applied to the CRT. This problem is overcome by the present invention as described below.

Returning to FIG. 3, in accordance with the present invention the encoded text and/or graphics data stored in memory 46 of the information source is converted to a corresponding teletext encoded signal and coupled to the antenna terminals of the television receiver during the vertical intervals of the television signal. The teletext encoded signal is processed by teletext decoder 20 of the receiver which synthesizes corresponding R, G, B baseband video signals for application to the CRT. Since these video signals are not processed by the normal video processing circuits of the receiver, they result in an extremely high quality video image reflecting the data stored in memory 46, the quality of this video image being limited only by the characteristics of display generator 32 and the CRT itself.

Figure 4:
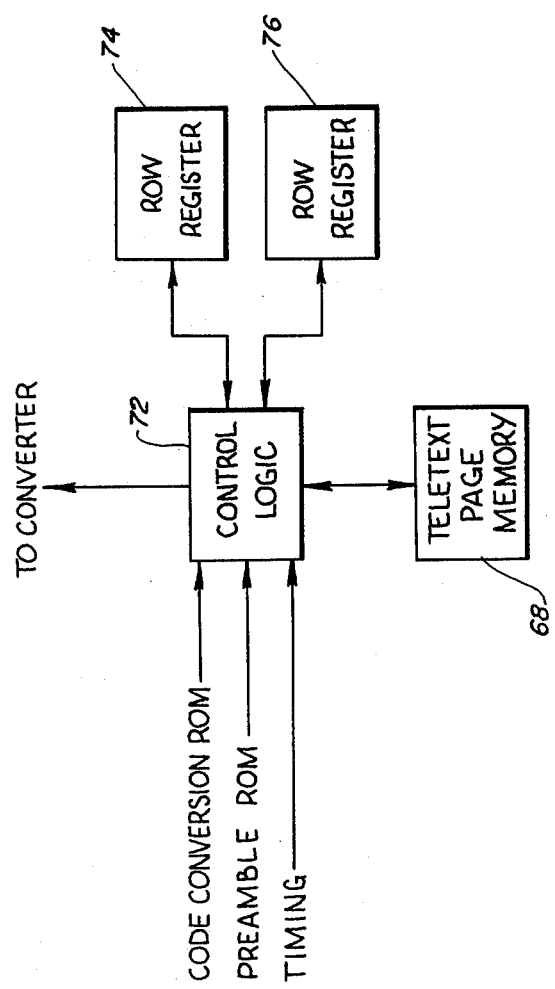
FIG. 4 is a block diagram illustrating the row update selector of FIG. 3 in more detail.

The conversion of the data stored in memory 46 to a corresponding teletext encoded signal is accomplished by a conversion circuit generally identified by reference numeral 60. Conversion circuit 60 basically comprises a code conversion ROM 62, a teletext format and preamble ROM 64, a row update selector 66, a page memory 68 and a parallel to serial converter 70. Code conversion ROM 62, which is responsive to the output of memory 46, is programmed for storing a complete set of teletext encoded character Bytes each of which is addressed by the closest matching multibit text and/or graphics code stored in memory 46. For example, if a code representing the letter "A" is read from memory 46 and applied to display generator 48 for producing a video signal representing the letter "A," the same code also addresses a memory location of code conversion ROM 62 storing a character Byte representing the letter "A" in teletext encoded form. The addressed teletext encoded character Byte is thereby read from ROM 62 and applied to an input of row update selector 66. Row update selector 66, see FIG. 4, comprises a control logic unit 72 and one or more row registers 74, each of the row registers having the capacity for storing one complete row of teletext encoded data. The particular number of row registers 74 comprising row update selector 66 is, in general, limited only by the number of horizontal lines in the vertical interval available for the transmission of teletext encoded data. Thus, if one horizontal line in the vertical interval is available row update selector 66 will comprise one row register 74, if two horizontal lines are available row update selector will comprise two row registers 74, and so on. The contents of memory 46 are typically accessed, on a row by row basis, once during each active scanning interval of the television signal developed on output conductor 54 of display generator 48. During these intervals, control logic 72 of row update selector 66 is enabled by timing generator 52 for sequentially coupling each row of converted character Bytes from code conversion ROM 62 for storage in one of the row registers 74. The data stored in the row register 74 is then compared to the data stored in the corresponding row of page memory 68, which is essentially identical to page memory 28 of decoder 20, by control logic 72. If this comparison indicates that the data stored in the row register is the same as the data stored in the corresponding row of page memory 68, then the row register will be cleared and the next row of converted character Bytes from code conversion ROM 62 will be coupled for storage in the register. If, however, the comparison indicates that the data stored in the row register is different from the data stored in the corresponding row of page memory 68, then the contents of the row register will be latched and also coupled through control logic 72 for replacing and thereby updating the contents of the corresponding row of page memory 68. Thereafter, the same process is repeated using any remaining row registers 74.

In accordance with the foregoing, upon the conclusion of comparing the entire converted contents of device memory 46 with the data stored in page memory 68 during one active scanning interval, row registers 74 of row update selector 66 will either be latched for storing data reflecting a changed or updated data row of device memory 46 or will be unlatched thereby reflecting no change in data stored in memory 46. In the case of the latter condition, control logic 72 is operative for coupling selected ones of the unchanged data rows stored in page memory 68 for storage in row registers 74, which selected data rows will be sequentially incremented during successive active scanning intervals. In this manner, control logic 72 executes a priority routine wherein the data stored in row registers 74 at the end of an active scanning interval will reflect a converted data row of device memory 46 with the data rows characterized by changed or updated data taking priority over data rows characterized by unchanged data.

Following each active scanning interval, i.e. during the succeeding vertical interval of the television signal developed on conductor 54, control logic 72 of row update selector 66 is enabled by timing generator 52 for coupling the latched contents of a first row register 74, in proper timed relation with the teletext data line preamble, see FIG. 1, from ROM 64 for loading parallel to serial converter 70. Converter 70 is subsequently clocked at about a 5.7 MHz rate for serially coupling the loaded data to one input of a summer 78 during a first teletext line of the vertical interval, the second input of summer 78 being derived from the output of display generator 48. Thereafter, the same procedure is repeated with regard to each additional row register 74 such that its contents are coupled in serial form to summer 78 as a teletext encoded signal during a subsequent teletext line of the vertical interval. The output of summer 78 therefore comprises a television signal whose active horizontal scanning intervals define a video signal corresponding to the contents of memory 46 and whose vertical intervals are used to define the contents of memory 46 in teletext encoded form. This television signal is modulated on a selected television channel RF carrier by channel modulator 50 and coupled therefrom to the antenna inputs of the television receiver. In the case where the television receiver, see FIG. 2, does not include a built-in teletext decoder, a display image corresponding to the contents of memory 46 will be produced in response to the video signal defined by the active horizontal scanning lines of the television signal in a normal fashion. The quality of this display image will, of course, be limited by the characteristics of the video processing circuits of the receiver. However, in the case where the receiver includes a built-in teletext decoder, the decoder may be enabled for synthesizing R, G, B video signals corresponding to the contents of memory 46 in response to the transmitted teletext encoded signals. The receiver's CRT is directly operated in response to these synthesized video signals and consequently produces a high quality display image reflecting the contents of memory 46.

From the foregoing, it will be appreciated that the teletext page memory 68 of FIG. 3 will be initially loaded with the converted contents of memory 46 during a number of successive vertical intervals in response to the operation of control logic 72 of row update selector 66. At the same time, the vertical intervals of the broadcast television signal are used to transmit the converted data in teletext format for storage in page memory 28 of teletext decoder 20. After page memories 28 and 68 are fully loaded with the converted contents of memory 46, data rows which reflect a change in the contents of memory 46 are transmitted with initial priority, which data rows replace the information previously stored in the corresponding rows of memories 28 and 68. Data rows which reflect no change in the contents of memory 46 are sequentially transmitted with secondary priority such that teletext encoded data is being continuously transmitted during successive vertical intervals of the television signal guaranteeing an accurate replication of data from memory 68 to memory 28. In this manner, page memory 28 of teletext decoder 20 is responsive for continuously reflecting the contents of memory 46 with any changed data being updated on a priority bases whereby the response time of the system is greatly decreased.

Figure 5:
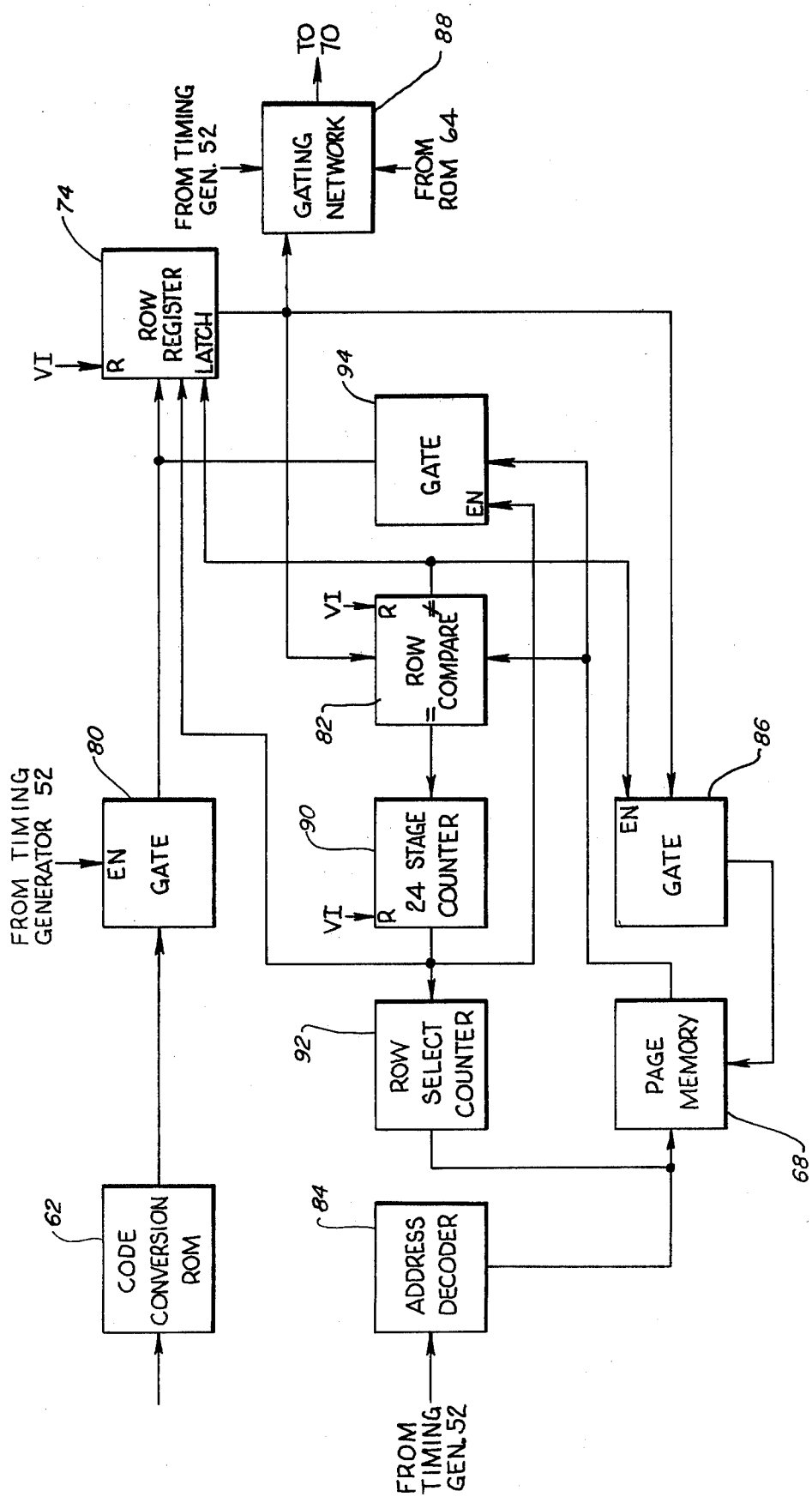
FIG. 5 is a detailed block diagram illustrating an exemplary embodiment of the control logic circuit of FIG. 4.

FIG. 5 illustrates an exemplary embodiment of control logic 72 of row update selector 66 incorporating a single row register 74, which embodiment may be conveniently expanded to accommodate any number of additional row registers. As illustrated in the drawing, control logic 72 includes an input gate 80 enabled during the active scanning interval of the television signal by timing generator 52 for coupling an initial row of converted character Bytes from ROM 62 for storage in row register 74, row register 74 having been reset during the preceding vertical interval. The row of character Bytes stored in row register 74 is coupled from the output thereof to one input of a row comparator 82, a second input of row comparator 82 being supplied with the corresponding row of character Bytes stored in page memory 68 which is addressed by an address decoder 84 operated in response to timing generator 52. Row comparator 82 is thereby effective for comparing the character Bytes of the data row stored in row register 74 with the character Bytes stored in the corresponding data row of page memory 68 and for developing either an equality or inequality output signal based on the comparison. If an inequality output signal is developed, indicating that at least one of the character Bytes of the data row has changed since the preceding active scanning interval, the contents of row register 74 are latched and a gate 86 is enabled. The latched contents of row register 74 are thereby coupled through enabled gate 86 for replacing or updating the data stored in the addressed data row of page memory 68. Thereafter each subsequent row of converted character Bytes is coupled from code conversion ROM 62 through gate 80 while address decoder 84 is operated for sequentially addressing the corresponding data row of page memory 68. However, there will be no change in the data stored in row register 74 since its contents had been previously latched. During the succeeding vertical interval the latched contents of row register 74 are suitably combined with the data stored in teletext format and preamble ROM 64 by a gating network 88 and coupled therefrom in parallel bit form to parallel to serial converter 70 for transmission during a horizontal line of the vertical interval as a teletext encoded signal.

If row comparator 82 had, instead of developing an inequality output signal, developed an equality output signal, indicating that the character Bytes of the data row stored in row register 74 had not changed since the preceding active scanning interval, row register 74 would have remained unlatched while a 24-state counter 90 is incremented. Thereafter, the next row of converted character Bytes is coupled through gate 80 from ROM 62 for storage in row register 74 while address decoder 84 is operated for addressing the corresponding data row of page memory 68. If another equality condition is ascertained, counter 90 is incremented again and the same procedure is repeated for the next data row. Each converted data row from ROM 62 will accordingly be compared to the data stored in the corresponding row of page memory 68 until either an inequality condition results for a particular row or a determination is made that all of the data rows supplied from code conversion ROM 62 during an active scanning interval are identical to the corresponding data rows stored in page memory 68. In the former case, as explained above, the data row resulting in the inequality condition is latched in row register 74, coupled for updating page memory 68 and transmitted as a teletext encoded signal during the next vertical interval for updating page memory 28 of teletext decoder 20. In the latter case, counter 90 is responsive to twenty four equality comparisons assuming a twenty four data row system, for developing an output signal incrementing a cyclical row select counter 92, enabling a gate 94 and latching row register 74. As a consequent, row select counter 92 addresses the initial data row of page memory 68 whose contents are coupled through enabled gate 94 and latched in row register 74. Therefore, during the succeeding vertical interval, this data row is transmitted as a teletext encoded signal as explained above.

The foregoing procedure is repeated during each succeeding active scanning interval. Thus, counter 90 is incremented in response to each active scanning interval during which no change in the data stored in device memory 46 is effected whereby row select counter 92 is operated for sequentially addressing the data rows of page memory 68, which data rows are transmitted as teletext encoded signals during successive vertical intervals. However, upon detection of a change in the data stored in device memory 46 during any active scanning interval, the converted data row reflecting the changed data is latched in row register 74 during the same active scanning interval and transmitted during the succeeding vertical interval. In this manner, data rows reflecting changed information receive priority over unchanged data rows in the transmission scheme greatly decreasing the response time of the overall system.

While particular embodiments of the invention have been shown and described, it will be obvious to those skilled in the art that changes and modifications may be made without departing from the invention in its broader aspects. Therefore, the aim of the appended claims is to cover all such changes and modifications as fall within the true spirit and scope of the invention.

I claim:

1. An interface circuit for use with a television receiver and means storing a plurality of digitally encoded signals each representing a selected text/graphics character intended for transmission as a corresponding video signal during the active scanning lines of a standard television signal comprising:

means converting each of said digitally encoded signals to a teletext encoded signal representing a corresponding text/graphics character;

means arranging said teletext encoded signals in a plurality of standard teletext formatted data rows;

means inserting in time multiplexed manner each of said teletext formatted data rows in a respective teletext line of said television signal;

means amplitude modulating said television signal including said video signal and said teletext lines on a television channel RF carrier; and means for coupling said modulated television signal to the antenna terminals of said television receiver, whereby a television receiver having a built-in teletext type decoder is operable in response to said teletext formatted data rows for displaying said selected text/graphics characters in a relatively high quality form and a standard television receiver is operable in response to the video signal comprising said active scanning lines for displaying said text/graphics characters in a poorer quality form.

2. Apparatus for use with a television receiver comprising:

means storing a plurality of digitally encoded signals each representing a selected text/graphics character;

first means converting said digitally encoded signals to a baseband video signal reflecting the corresponding text/graphics characters and comprising a plurality of active horizontal scanning lines of a standard television signal;

second means converting each of said digitally encoded signals to a teletext encoded signal representing a corresponding text/graphics character;

means inserting in a time multiplexed manner said teletext encoded signals as a plurality of teletext formatted data rows in successive teletext lines of said television signal;

means amplitude modulating said television signal including said video signal and said teletext lines on a television channel RF carrier; and means for coupling said modulated television signal to the antenna terminals of said television receiver, whereby a television receiver having a built-in teletext type decoder is operable in response to said teletext formatted data rows for displaying said selected text/graphics characters in a relatively high quality form and a standard television receiver is operable in response to the video signal comprising said active horizontal scanning lines for displaying said text/graphics characters in a poorer quality form.

3. Apparatus according to claim 2 wherein said second converting means comprises memory means storing a plurality of teletext encoded text/graphics characters at a plurality of respective memory locations, each of said memory locations being addressed by the digitally encoded signal representing the corresponding text/graphics character.

4. Apparatus according to claim 2 wherein said inserting means comprises means inserting the teletext formatted data rows comprising recently changed ones of said teletext encoded signals in said teletext lines on a priority basis in relation to the teletext formatted data rows comprising unchanged ones of said teletext encoded signals.

5. Apparatus according to claim 2 wherein said stored digitally encoded signals are arranged in a plurality of data rows and wherein said inserting means comprises:

means comparing the teletext encoded signals corresponding to each data row of said digitally encoded signals with the corresponding data row during successive active scanning intervals of said television signal; and means responsive to said comparing means for inserting the teletext encoded signals corresponding to each data row of said digitally encoded signals resulting in an inequality comparison in a teletext line of said television signal as a teletext formatted data row on a priority basis in relation to the teletext encoded signals corresponding to the data rows of said digitally encoded signals resulting in an equality comparison.

6. Apparatus according to claim 5 wherein said inserting means comprises means for inserting the teletext encoded signals corresponding to each of the data rows of said digitally encoded signals resulting in an equality comparison in a teletext line of said television signal as a teletext formatted data row on a sequential basis.

7. Apparatus for use with a television receiver comprising:

means storing a plurality of data rows each comprising a plurality of digitally encoded signals, each of said digitally encoded signals representing a selected text/graphics character;

first means converting the digitally encoded signals comprising each of said data rows to a video signal reflecting the corresponding text/graphics characters, each of said video signals comprising a plurality of successive horizontal scanning lines in the active scanning interval of a standard television signal;

second means converting the digitally encoded signals comprising each of said data rows to a respective plurality of teletext encoded signals representing the corresponding text/graphics characters;

means comparing the teletext encoded signals corresponding to each data row of said digitally encoded signals with the corresponding data row during successive active scanning intervals of said television signal;

means responsive to said comparing means for inserting in a time multiplexed manner the teletext encoded signals corresponding to each data row of said digitally encoded signals resulting in an inequality comparison in a teletext line of said television signal as a teletext formatted data row on a priority basis in relation to the teletext encoded signals corresponding to data rows of said digitally encoded signals resulting in an equality comparison; and means amplitude modulating said television signal including said video signal and said teletext lines on a television channel RF carrier.

8. Apparatus according to claim 7 wherein said second converting means comprises memory means storing a plurality of teletext encoded text/graphics characters at a plurality of respective memory locations, each of said memory locations being addressed by the digitally encoded signal representing the corresponding text/graphics character.

9. Apparatus according to claim 7 wherein said inserting means comprises means for inserting the teletext encoded signals corresponding to each of the data rows of said digitally encoded signals resulting in an equality comparison in a teletext line of said television signal as a teletext formated data row on a sequential basis.

10. In a system of the type including means storing a plurality of digitally encoded signals each representing a selected text/graphics character intended for transmission as a corresponding video signal during the active scanning intervals of a television signal, the method comprising:
 converting each of said digitally encoded signals to a teletext encoded signal representing a corresponding text/graphics character;
 inserting in a time multiplexed manner said teletext encoded signals as a plurality of teletext formatted data rows in successive teletext lines of said television signal; and
 amplitude modulating said television signal including said video signal and said teletext lines for transmission on a television channel RF carrier.

11. In a system of the type including means storing a plurality of digitally encoded signals each representing a selected text/graphics character intended for transmission as a corresponding video signal during the active scanning intervals of a television signal, the method comprising:
 converting each of said digitally encoded signals to a baseband video signal reflecting the corresponding text/graphics characters and comprising a plurality of horizontal scanning lines of a standard television signal;
 converting each of said digitally encoded signals to a teletext encoded signal representing a corresponding text/graphics character;
 inserting in a time multiplexed manner said teletext encoded signals as a plurality of teletext formatted data rows in successive teletext lines of said television signal; and
 amplitude modulating said television signal including said video signal and said teletext lines for transmission on a television channel RF carrier.

12. In a system of the type including means storing a plurality of data rows each comprising a plurality of digitally encoded signals each of said digitally encoded signals representing a selected text/graphics character intended for transmission as a corresponding video signal during the active scanning intervals of a television signal, the method comprising:
 converting the digitally encoded signals comprising each of said data rows to a respective plurality of teletext encoded signals representing the corresponding text/graphics characters;
 comparing the teletext encoded signals corresponding to each data row of said digitally encoded signals with the corresponding data row during successive active scanning intervals of said television signal;
 inserting in a time multiplexed manner the teletext encoded signals corresponding to each data row of said digitally encoded signals resulting in an inequality comparison in a teletext line of said television signal as a teletext formatted data row on a priority basis in relation to the teletext encoded signals corresponding to data rows of said digitally encoded signals resulting in an equality comparison; and
 amplitude modulating said television signal including said video signal and said teletext lines for transmission on a television channel RF carrier.

* * * * *